J. R. MOFFITT.
Vulcanizing Apparatus.
No. 63,550.  Patented April 2, 1867.
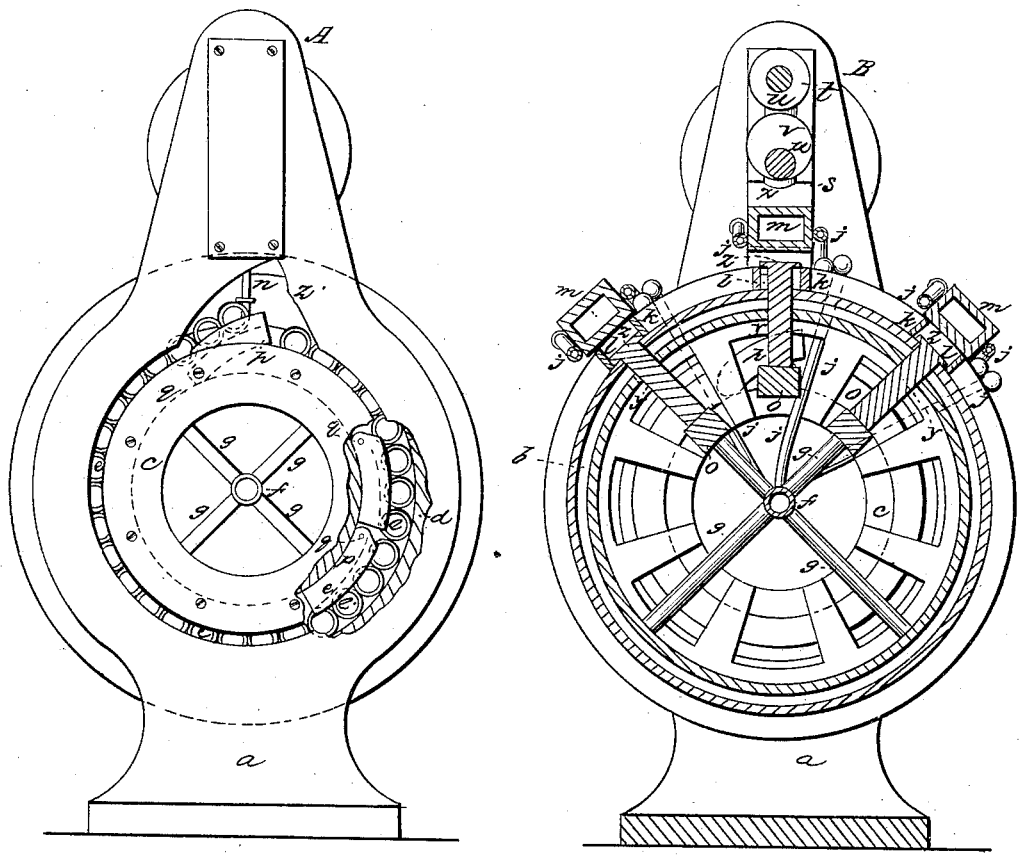
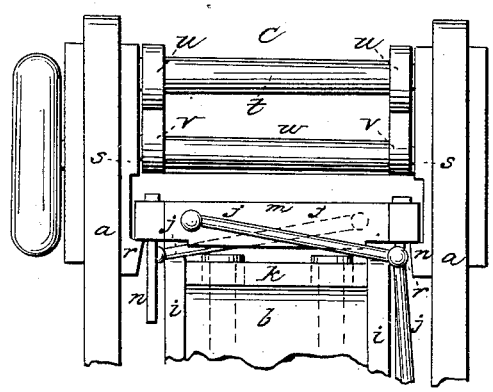
Witnesses:
M. W. Frothingham.
J. B. Kidder.
Inventor:
J. R. Moffitt
by his Attys.
Crosby & Gould

United States Patent Office.

JOHN R. MOFFITT, OF CHELSEA, MASSACHUSETTS.

Letters Patent No. 63,550, dated April 2, 1867.

---

IMPROVED APPARATUS FOR MOULDING AND VULCANIZING ARTICLES OF RUBBER.

---

*The Schedule referred to in these Letters Patent and making part of the same.*

---

TO ALL WHOM IT MAY CONCERN:

Be it known that I, JOHN R. MOFFITT, of Chelsea, in the county of Suffolk, and State of Massachusetts, have invented an Improved Apparatus for Moulding and Vulcanizing Rubber Articles; and I do hereby declare that the following, taken in connection with the drawings which accompany and form part of this specification, is a description of my invention sufficient to enable those skilled in the art to practise it.

The invention relates to the general construction of a press or moulding apparatus for vulcanizing articles of rubber in moulds, under the combined action of heat and pressure.

The invention consists primarily in constructing a rotary steam cylinder or steam-chamber, with a surface to which moulds or mould-boxes of various sizes may be confined between the heads of the cylinder; and in the mechanism or arrangement of mechanism for operating hollow steam-heated platens or followers, which press and hold the rubber in the moulds during the process of vulcanization. Also in the details of construction and arrangement of mechanism through which the pressure of the platens against the moulds is produced, and in the arrangement of pipes through which steam is introduced into each platen.

The drawings represent an apparatus embodying the invention, A showing an end elevation, and B a vertical cross-section thereof. $a\ a$ denote uprights or standards, between which is mounted a rotary steam-cylinder or case $b$, carrying at each end a circular ring or wheel, $c$, by which it is supported in position with respect to the standards or framework. Each standard is cut out circularly to receive the wheel, and each has a groove, $d$, formed around the circular opening, while each of the supporting-wheels has a similar groove, $e$, around its periphery, in line with the groove $d$, a series of friction-rolls or tubes, $e'$, fitting into the adjacent grooves for the wheel to turn upon, the wheels being supported in position by these rolls, and in such manner as to permit free rotation of the wheels and cylinder. A steam pipe, $f$, extends centrally through the cylinder, from which radial pipes, $g$, communicate with the steam-chamber $h$ of the cylinder. Around the outer surface of the cylinder, and between the heads $i$ thereof, are arranged series of moulds or mould-boxes $k$, each containing a number of cells or mould-recesses, $l$. Over or in radial line with each mould-box is hung a hollow platen or follower, $m$, fixed upon the ends of rods, $n$, projecting from a cross-bar, $o$, which extends through the cylinder $b$. Each wheel or ring $c$ is made up in part of a series of swing-pieces or felloes $p$, each hung at one end on a pin, $q$, and resting at its other end on or just over one end of the bar $o$, these felloe-pieces containing the peripheral groove above referred to. Each end of the platen $m$ projects over the cylinder-head (as seen at C, which represents a side view of the upper part of the cylinder and adjacent parts) in such manner that as each platen comes uppermost by the rotation of the cylinder, the projecting ends come over shoulders or lifters, $r$, at the bottom of vertical slides, $s$, hung on a loose shaft, $t$, which carries rolls or drums, $u$, resting upon eccentrics $v$, on a parallel shaft, $w$, this latter shaft turning in bearings in the uprights $a$. Each slide $s$ has a long slot, $x$, through which both shafts extend, the slides hanging upon the upper shaft at the tops of these slots. When any platen comes uppermost, by turning shaft $w$, (by means of a hand-wheel or otherwise,) the eccentrics $v$ will raise the shaft $t$, and with it the slides, causing the lifters $r$ to lift the platen, and with it the cross-bar $o$. Now, to each cross-bar $o$ are fixed rods $y$, at the outer end of each of which is a block, $z$, projecting into and forming the bottom of one of the mould-cells or recesses $l$, and as the bar $o$ is raised, these blocks rise with it and push from the moulds the vulcanized articles. Steam to heat each platen is conducted into and from the platen by pipes $j$, jointed together in such manner as to turn on the joints to allow free rise and descent of the platen without straining the pipes.

The operation of the apparatus is as follows: As each mould-box comes uppermost, the shaft $w$ is turned, causing the eccentrics to raise the platens, and the blocks forming the bottoms of the cells to rise and expel the vulcanized and moulded articles; and the rise of the bar $o$ lifts the felloes resting upon its ends, as seen at A, each standard having a recess, $z'$, to permit the upward movement of the felloe and the rings or rolls in its groove. The rotation of the shaft is then continued sufficiently to allow the blocks to sink into the recesses, and pieces of rubber to be moulded and vulcanized are then placed in the cells. The platen is now allowed to descend upon the rubber, and the cylinder is turned to bring the next mould-box into position. As the mould just filled moves forward, the rolls on the raised felloes roll into the grooves in the standards pressing down the raised felloes, and with them the bar $o$, thus bringing the platen down upon the rubber and compressing it into the mould recesses, and holding them subjected to the pressure of the platen and the heat from the steam-chamber of the cylinder and that from the platen during the entire rotation of the mould, or until it next comes uppermost to have the moulded articles discharged therefrom, each mould being discharged and re-filled at each revolution, or after repeated revolutions, as may be desirable. In the drawings I have only shown three contiguous mould-boxes arranged upon the cylinder, but it will be obvious that the whole surface may be covered with moulds, each provided with a platen or follower, or that any number may be placed upon the same, as circumstances may require; and it will also be obvious that the arrangement is not confined to the use of moulds or mould-boxes of particular size or width, as the plain or outer cylinder surface of the cylinder allows such widths to be varied as may be desirable. The whole arrangement is simple and effective, not liable to get out of order, and capable of being very easily worked.

I claim the construction of the cylinder with a steam-chamber, the outer surface of which is made capable of receiving moulds or mould-boxes of various sizes, substantially as set forth.

Also combining with the cylinder the grooved wheels with swinging felloes, and the groove-ways in the uprights, substantially as set forth.

Also the employment of the friction-rings or rolls running in the grooves, substantially as set forth.

Also, in combination with the mould-cylinder and each mould thereof, the hollow steam-heated platen or follower.

Also, in combination with each platen or follower, the bar $o$, having the mould-blocks $z$, and the platen or follower connected therewith and operated thereby, substantially as set forth.

Also the combination of the shafts $t\ w$, eccentrics $v$, and lifters $r$, for raising the platen, substantially as described.

Also combining with each hollow, steam-heated platen or follower, the jointed or movable steam pipes, for conducting steam into and from the platen, substantially as shown and described.

J. R. MOFFITT.

Witnesses:
FRANCIS GOULD,
J. B. CROSBY.